United States Patent [19]

Holmes et al.

[11] Patent Number: 4,774,835

[45] Date of Patent: Oct. 4, 1988

[54] METHOD FOR LAMINAR BOUNDARY LAYER TRANSITION VISUALIZATION IN FLIGHT

[75] Inventors: Bruce J. Holmes, Newport News; Peter D. Gall, Gloucester Point, both of Va.

[73] Assignee: The United States of America as represented by the Administrator of the National Aeronautics and Space Administration, Washington, D.C.

[21] Appl. No.: 929,862

[22] Filed: Nov. 13, 1986

[51] Int. Cl.[4] ............................................. G01M 9/00
[52] U.S. Cl. .................................... 73/147; 116/265; 116/DIG.43
[58] Field of Search ................................ 73/147, 104; 116/DIG. 43, 264, 265; 346/1; 137/804

[56] References Cited

U.S. PATENT DOCUMENTS

| | | | |
|---|---|---|---|
| 3,511,086 | 5/1970 | Woodmansee | 73/104 |
| 3,529,156 | 9/1970 | Fergason et al. | 428/1 |
| 3,620,889 | 11/1971 | Baltzer | 161/5 |
| 3,787,874 | 1/1974 | Urban | 346/1 |
| 3,847,139 | 11/1974 | Flam | 116/114.5 |
| 4,101,696 | 7/1978 | Jennen et al. | 428/1 |
| 4,175,543 | 11/1979 | Suzuki et al. | 128/736 |

Primary Examiner—Donald O. Woodiel
Attorney, Agent, or Firm—George F. Helfrich; John R. Manning; Charles E. B. Glenn

[57] ABSTRACT

Disclosed is a method of visualizing laminar to turbulent boundary layer transition, shock location, and laminar separation bubbles around a test surface. A liquid crystal coating is formulated using an unencapsulated liquid crystal operable in a temperature bandwidth compatible with the temperature environment around the test surface. The liquid crystal coating is applied to the test surface, which is preferably pre-treated by painting with a flat black paint to achieve a deep matte coating, after which the surface is subjected to a liquid or gas flow. Color change in the liquid crystal coating is produced in response to differences in relative shear stress within the boundary layer around the test surface.

2 Claims, 1 Drawing Sheet

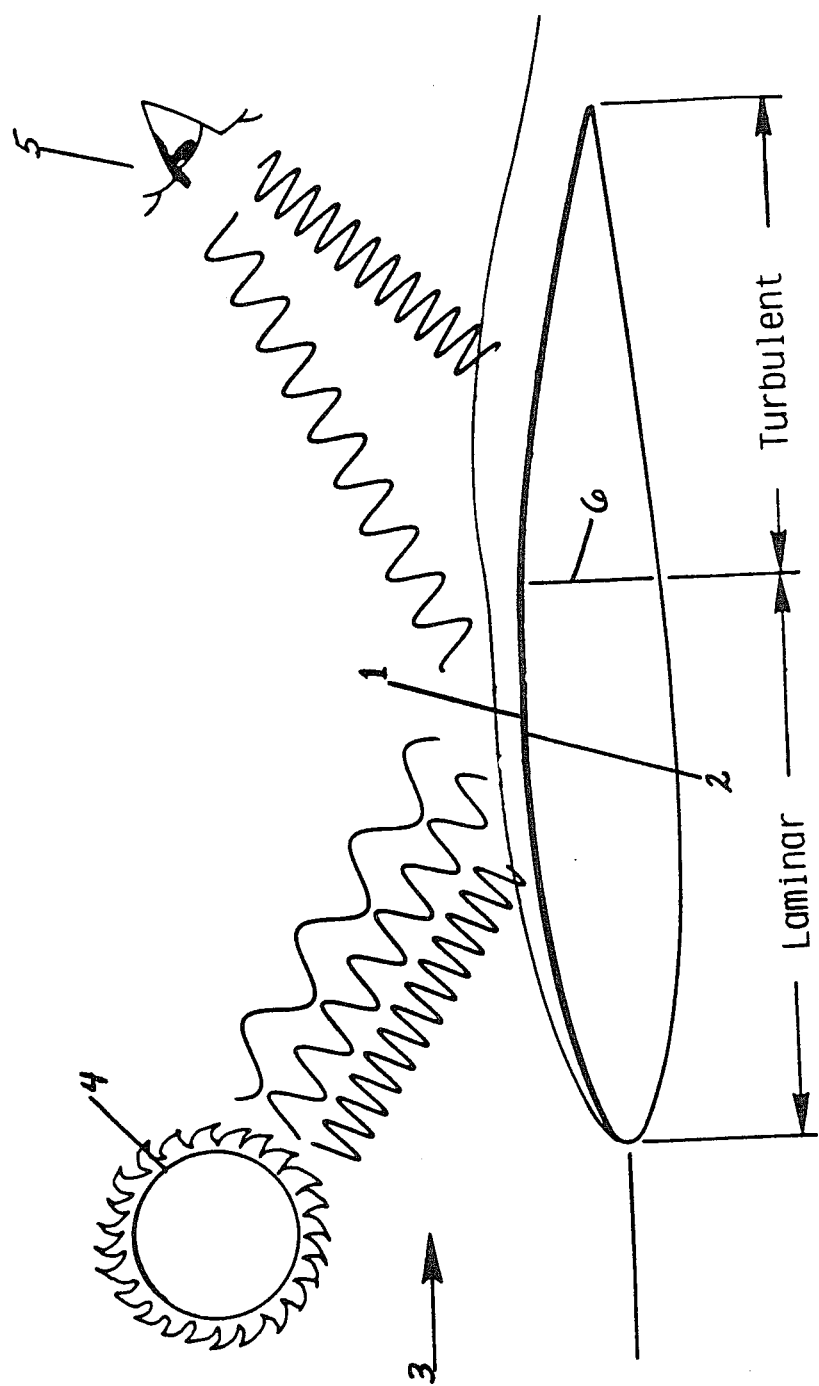

METHOD FOR LAMINAR BOUNDARY LAYER TRANSITION VISUALIZATION IN FLIGHT

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to boundary layer transition measurements and more particularly to a method of visualizing laminar to turbulent boundary layer transition in flight environments.

The visualization of laminar to turbulent boundary layer transition plays an important role in flight and wind tunnel aerodynamic testing of aircraft wing and body surfaces. Visualization helps provide a more complete understanding of both transition locations and transition modes. Without visualization, the transition process is very difficult to understand.

Several flow visualization methods have previously been developed to measure laminar boundary layer transition to turbulence. These methods include the use of oil, flows, liquid films, china clay and subliminating chemicals. These prior methods suffer from numerous disadvantages which preclude their practical use for in-flight aerodynamic testing. Chief among these disadvantages is that for many atmospheric conditions the previous methods are not of practical use, particularly at higher altitudes and colder temperatures. Moreover, these methods do not have a rapid time response: and, as the methods are not reversible, only one transition measurement per flight can be obtained. Liquid crystals have great potential for overcoming the debilitating limitations of prior methods of boundary layer flow visualization.

Liquid crystals are a peculiar state of matter between solid and liquid. Although they appear as oily liquids, they have certain mechanical properties which are similar to solid crystals. In particular, liquid crystals scatter light very selectively. In their molecular state they are arranged in a series of slabs. Each molecule is long (with an aspect ratio of about 8), and in each slab the molecules are aligned with each other. The slabs are rotated slightly, one on top of the other, forming a helix of molecular orientation. Fortuitously, the pitch length of the resulting helix is in the range of wavelengths of visible light. Thus, when the helix is subjected to certain physical influences, the helix pitch changes and the wavelength of reflected light changes accordingly. In this fashion liquid crystal coatings change colors in response to changes in shear stress, temperature, pressure, ferromagnetism, and certain chemical vapors. Since the fundamental chemical structure is unaffected by these changes, a liquid crystal coating will respond repeatably to the same physical changes. Thus, the color changes of some liquid crystal formulations can be reversible virtually indefinitely.

Accordingly, it is an object of this invention to provide a new method of in-flight boundary layer transition visualization which is reversible, non-toxic, easy to apply, inexpensive, and has a rapid time response.

A further object of this invention is to provide a method of in-flight transition visualization which is applicable throughout the altitude and speed ranges of all subsonic aircraft flight envelopes.

A further object of this invention is to provide a method of boundary layer transition visualization which is applicable to water tunnel research.

Other objects and advantages of this invention will become apparent hereinafter in the specification which follows.

SUMMARY OF THE INVENTION

For use in aerodynamic or hydrodynamic testing, a liquid crystal coating is formulated to change colors in response to differences in relative shear stress within the temperature environment of a test object. This liquid crystal coating is then applied to the surface of the test object, and the test object is subjected to a liquid or gas flow either in flight or in a wind or water tunnel. By recording and measuring the color changes produced within the boundary layer surrounding the surface of the test object, transition locations and modes are observed as well as such aerodynamic phenomena as shock locations and laminar separation bubbles.

BRIEF DESCRIPTION OF THE DRAWING

The single drawing FIGURE schematically illustrates the use of a liquid crystal coating in visualizing boundary layer transition, as contemplated by the present invention.

DETAILED DESCRIPTION OF THE INVENTION

Before describing the use of a liquid crystal coating in visualizing boundary layer transition as contemplated by the present invention, a brief discussion of relevant boundary layer behavior is in order. As boundary layers develop in fluid flow over any surface, shear stress is affected by local pressure gradient, Reynolds number, Mach number, and surface roughness. As Mach number increases, wall temperatures increase relative to freestream static values, as a result of compressibility. The amount of temperature rise depends on whether the wall is in a laminar or a turbulent boundary layer. Wall temperature is slightly greater at subsonic speeds in turbulent boundary layers. The most significant change in shear stress and temperature at compressible speeds occurs with transition from laminar to turbulent flow. The magnitude of shear stress can change by a factor of as much as eight, depending on Reynolds number, and wall temperature can change by more than 30° F. near $M=1$. Liquid crystal coatings indicate transition by changing colors in response to these large relative differences in wall shear and temperature.

For use in aerodynamic or hydrodynamic testing, a liquid crystal coating is formulated to change colors in response to differences in relative shear stress within the temperature environment of a test object. Referring to the drawing, this liquid crystal coating 1 is then applied to a test surface 2 of the test object, and the test object is subjected to a liquid or gas flow 3 either in flight or in a wind or water tunnel. The test surface 2 is prepared by painting with a flat black paint, preferably applied to achieve a deep matte-paint coating texture. This deep matte paint surface absorbs a sufficient quantity of the liquid crystal to provide reliable performance of the flow visualization method. The liquid crystal material 1 may be applied to the painted surface by spraying or brushing. Employing a light source 4 and recording and measuring (as at 5) the color changes produced within the boundary layer surrounding the surface of the test object, transition locations and modes can be observed as well as aerodynamic phenomena such as shock locations and laminar separation bubbles 6.

For a particular application, it is important that the liquid crystal operational temperature bandwidth is compatible with the temperature environment experienced on the test surface. When this condition is met, shear stress dominates over temperature in determining the liquid crystal color response. Liquid crystals with narrower temperature response bandwidths can have greater sensitivity to smaller changes in shear than wider bandwidth formulations. However, a major disadvantage of using narrow temperature bandwidth crystals is that only slight changes in the test environment temperature can cause the crystals to turn clear or opaque as the temperature changes out of the active response range. Small changes in altitude and/or Mach number (compressibility heating) can easily cause this to occur. At constant speed (Mach number), for example, a bandwidth of 35° F. would provide liquid crystal color response over an altitude range of about 10,000 feet (assuming adiabatic lapse rate). Thus, for many flight applications, wider temperature bandwidth liquid crystal formulations are desirable to provide maximum test flexibility in terms of speed and altitude.

The particular liquid crystal formulation to be used on any given test object in any given environment must be determined experimentally. An example is provided using a Gates Learjet Model 28/29. This aircraft is a high performance two-engine business transport. Past flight research shows the wing and winglet on this airplane to provide extensive runs of laminar flow. Particularly useful is the high altitude capability of the airplane, which allows test conditions extending up to speeds of Mach 0.8 and altitudes of 51,000 feet.

In determining the proper liquid crystal formulations to use, the approximate surface wall temperature must be estimated for the flight condition of interest. During the Learjet flight tests, the flight conditions at the event temperature for the liquid crystal coating are recorded. Based on these records, the surface temperature is estimated using the following equation and assuming a temperature recovery factor, K, of 0.58-0.70 for the laminar boundary layer:

$$T_w = T_s\left(1 + \frac{\gamma - 1}{2} KM^2\right)$$

where:
$T_w$=adiabatic wall temperature,
$T_s$=static temperature,
$\gamma$=ratio of specific heats,
K=temperature recovery factor, and
M=Mach number.

Normally, for adiabatic surfaces, K=0.84 for laminar and K=0.86-0.88 for turbulent boundary layers; however, since typical airplane wing surfaces are adiabatic, the actual temperature recovery is reduced.

Upon reaching the appropriate flight condition (Mach number, and altitude) the liquid crystal coating develops different colors in the laminar and turbulent boundary layers, or develops a color pattern at the transition location, depending on the formulation used. Tests have shown the lighting angle to be the dominating factor in determining coating color indications. The best lighting angles are those which place the light source behind the viewer. Optimum angles between the light source, the test surface plane, and the viewer can best be determined by orbiting the aircraft in a circular path, and varying the bank angle until the most brilliant color reflections are observed. This procedure helps locate the optimum combinations of sun and viewing angles. If the test contains substructure which acts as a heat source or sink, these locations appear either as colored or as colorless areas. Therefore, a knowledge of the airframe structure is important to avoid misinterpretation of coating patterns in such areas.

Liquid crystals can be formulated to change colors across the entire visible bandwidth as small as 0.9° F. or as large as 90° F. Temperatures for initial color indication can vary from as low as −22° F. up to 480° F. The event temperature is defined as the lowest temperature when the first color indication is visible. The clearing temperature is the upper temperature limit where the last color indication is observed, and the temperature bandwidth is the temperature range between the first red indication and the first blue indication. Whether the first color indication will be deep red or violet depends on the direction in which the molecular helix is wound. Typically, blue marks the upper end, and red marks the lower end of the active temperature range. Liquid crystal coatings can respond very rapidly to changes in shear stress or temperature distribution; time constants as small as 0.2 seconds have been observed. To date, there are no known human toxic hazards associated with the use of liquid crystals. For many relatively higher temperature applications, cholesteric liquid crystals are used. In high-altitude environments, chiral nematic types of liquid crystals have been most successfully used, since they can be formulated with much lower temperature bandwidth ranges than cholesteric formulations. With care, the liquid crystals are also used to indicate the locations of such aerodynamic phenomena as shock locations and laminar separation bubbles, as well as separated flows. Liquid crystals also have been found to be quite useful in wind tunnels, where they have worked well at dynamic pressures as low as 5 psf.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method of visualizing laminar to turbulent boundary layer transition, shock location, and laminar separation bubbles around a test surface, the method comprising:
    formulating a chiral nematic liquid crystal coating using an encapsulated liquid crystal operable in a temperature bandwidth compatible with the temperature environment around the test surface;
    applying said chiral nematic liquid crystal coating to the test surface; and
    subjecting the test surface to a liquid or gas flow;
    whereby a color change is produced in response to differences in relative shear stress within the boundary layer around the test surface.

2. A method according to claim 1 wherein the test surface is prepared by painting with a flat, black paint to achieve a deep matte coating which is capable of absorbing the chiral nematic liquid crystal material.

* * * * *